United States Patent
Suzuki et al.

(10) Patent No.: US 9,714,638 B2
(45) Date of Patent: *Jul. 25, 2017

(54) IGNITION TIMING CONTROL DEVICE AND IGNITION SYSTEM

(71) Applicant: NGK SPARK PLUG CO., LTD., Nagoya-shi, Aichi (JP)

(72) Inventors: Isao Suzuki, Ichinomiya (JP); Katsunori Yazawa, Kasugai (JP); Hiroshi Inagaki, Komaki (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 277 days.

This patent is subject to a terminal disclaimer.

(21) Appl. No.: 14/353,334

(22) PCT Filed: Sep. 23, 2013

(86) PCT No.: PCT/JP2013/005605
§ 371 (c)(1),
(2) Date: Apr. 22, 2014

(87) PCT Pub. No.: WO2014/068836
PCT Pub. Date: May 8, 2014

(65) Prior Publication Data
US 2015/0233338 A1    Aug. 20, 2015

(30) Foreign Application Priority Data

Oct. 31, 2012  (JP) .................................. 2012-240792
Jul. 19, 2013  (JP) .................................. 2013-150755

(51) Int. Cl.
F02P 5/152    (2006.01)

(52) U.S. Cl.
CPC .................................. F02P 5/152 (2013.01)

(58) Field of Classification Search
CPC .. F02P 5/152; F02P 5/00; F02P 5/1521; F02P 5/1522; F02P 5/16
(Continued)

(56) References Cited

U.S. PATENT DOCUMENTS 7,469,678 B2    12/2008  Ruiz
8,204,672 B2 *  6/2012  Mylaraswamy ....... G06Q 10/06
                                                                123/437
(Continued)

FOREIGN PATENT DOCUMENTS

CN        1670351 A     9/2005
CN      101235785 A     8/2008
(Continued)

OTHER PUBLICATIONS

International Search Report (PCT/ISA/210) dated Oct. 15, 2013, issued by the International Searching Authority in corresponding International Application No. PCT/JP2013/005605.
(Continued)

*Primary Examiner* — Hung Q Nguyen
*Assistant Examiner* — Xiao Mo
(74) *Attorney, Agent, or Firm* — Sughrue Mion, PLLC (57) ABSTRACT

The present invention provides an ignition timing control device and an ignition system which are capable of performing ignition timing control that easily suppresses occurrence of knocking for internal combustion engine. An ignition timing control device has a knocking detection device 41 detecting knocking of internal combustion engine; and an ignition timing adjustment device 43 adjusting ignition timing of internal combustion engine according to a knocking signal obtained from knocking detection device 41 and indicating knocking state and an externally-obtained signal concerning the ignition timing of the internal combustion engine. Knocking detection device 41 and ignition timing (Continued)

adjustment device 43 are electrically connected and formed integrally with each other. Ignition timing adjustment device 43 is provided with a first connecting portion 101 inputting the signal concerning the ignition timing and a second connecting portion 103 outputting the signal concerning the ignition timing that undergoes adjustment to a switching element 376.

13 Claims, 9 Drawing Sheets

(58) Field of Classification Search
USPC ............ 123/406.21, 406.29, 406.37, 306.34, 123/406.39
See application file for complete search history.

(56) References Cited

U.S. PATENT DOCUMENTS

| 8,333,065 | B2* | 12/2012 | Weber ...................... F01N 3/18 123/568.11 |
| 2008/0183374 | A1 | 7/2008 | Ruiz |
| 2010/0199959 | A1* | 8/2010 | Brown ................ F02D 41/0052 123/672 |
| 2012/0192833 | A1* | 8/2012 | Hagari .................. F02D 35/027 123/406.35 |
| 2012/0290195 | A1* | 11/2012 | Irie ..................... F02D 13/0238 701/104 |
| 2012/0296558 | A1* | 11/2012 | Ono ........................ F02P 5/152 701/111 |
| 2015/0027409 | A1* | 1/2015 | Inagaki ................... F02P 5/152 123/406.29 |

FOREIGN PATENT DOCUMENTS

| JP | 63-9678 A | 1/1988 |
| JP | 04-81575 A | 3/1992 |
| JP | 07-103118 A | 4/1995 |
| JP | 2001-006843 A | 1/2001 |
| JP | 2002-228624 A | 8/2002 |
| JP | 2005-171997 A | 6/2005 |
| JP | 2006-232955 A | 9/2006 |
| JP | 2008-196904 A | 8/2008 |
| JP | 2008-215141 A | 9/2008 |
| JP | 3147755 U | 1/2009 |

OTHER PUBLICATIONS

Communication dated Sep. 21, 2015 from the State Intellectual Property Office of the P.R.C. in Application No. 201380003318.9.
Communication dated Oct. 4, 2016 from the Japanese Patent Office in Application No. 2013-150756.

* cited by examiner

IGNITION TIMING CONTROL DEVICE AND IGNITION SYSTEM

CROSS REFERENCE TO RELATED APPLICATIONS

This application is a National Stage of International Application No. PCT/JP2013/005605, filed Sep. 23, 2013, claiming priority from Japanese Patent Application Nos. 2013-150755, filed Jul. 19, 2013 and JP 2012-240792, filed Oct. 31, 2012, the contents of all of which are incorporated herein by reference in their entirety.

TECHNICAL FIELD

The present invention relates to an ignition timing control device that controls an ignition timing according to a knocking state of an internal combustion engine (an engine), and relates to an ignition timing control device and an ignition system that can be applied to an engine such as a general purpose engine used for, for instance, a small craft, a small generator and a lawn mower, an engine for a motorcycle and an engine used for various kinds of construction equipment.

BACKGROUND ART

As a technique of properly controlling an engine operation while preventing the knocking of the engine, a technique in which a knocking sensor is secured to the engine and an ignition timing control that controls an ignition timing on the basis of an output of the knocking sensor is performed has been known (see Patent Document 1).

This ignition timing control is a control that attempts to make full use of an engine output while preventing an occurrence of the knocking, by advancing the ignition timing step by step when the knocking is not detected by the knocking sensor, and by retarding the ignition timing when the knocking is detected.

The above ignition timing control using the output of the knocking sensor is commonly used for four-wheel vehicles. However, in a case of an engine whose structure is simple such as the general purpose engine for the small generator and the engine for the motorcycle, although an electronic controller that performs an engine control such as an engine revolution speed is used, the knocking sensor is not generally used. Thus, in the present circumstances, the ignition timing control to prevent the knocking is not carried out for such engine.

CITATION LIST

Patent Document

Patent Document 1: Japanese Patent Provisional Publication Tokkaihei No. JP2008-215141

SUMMARY OF THE INVENTION

Technical Problem

Nowadays, however, to optimize fuel economy (gas mileage) and the engine output, a precise ignition control is required even for the engine having the simple structure such as the general purpose engine and the motorcycle engine. As a solution for this requirement, it is conceivable that the knocking sensor will be mounted then the above ignition timing control will be performed. However, the following problem arises.

That is, in a case where the knocking sensor is secured to the general purpose engine and the motorcycle engine in current use and the ignition timing control is performed, redesign to perform the ignition timing control is necessary for the electronic controller that performs the conventional engine control. Thus, this causes enormous work (man-hour) and cost.

The present invention is made for solving the above problem, and an object of the present invention is to provide an ignition timing control device and an ignition system which are capable of performing the ignition timing control that easily suppresses the occurrence of the knocking for the internal combustion engine that has no function of the ignition timing control suppressing the occurrence of the knocking.

Solution to Problem

An ignition timing control device of the present invention comprises: a knocking detection device that detects knocking of an internal combustion engine; and an ignition timing adjustment device that adjusts an ignition timing of the internal combustion engine on the basis of a knocking signal indicating a knocking state which is obtained from the knocking detection device and a signal concerning the ignition timing of the internal combustion engine which is externally obtained, and the knocking detection device and the ignition timing adjustment device being electrically connected and formed integrally with each other, and the ignition timing adjustment device being provided with a first connecting portion which inputs the signal concerning the ignition timing; and a second connecting portion which is connected to a capacity discharge circuit section for igniting the internal combustion engine, the capacity discharge circuit section having a capacitor and a switching element for use in discharging electric charge stored in the capacitor, and which outputs the signal concerning the ignition timing that undergoes adjustment to the switching element.

The ignition timing control device of the present invention is configured so that the knocking detection device and the ignition timing adjustment device are electrically connected and formed integrally with each other, and also the knocking signal from the knocking detection device and the signal concerning the ignition timing externally obtained are inputted to the ignition timing adjustment device.

Therefore, the ignition timing adjustment device can adjust the ignition timing (correct the ignition timing, e.g. advance or retard the ignition timing) so as to achieve a proper ignition timing on the basis of the knocking signal from the knocking detection device and the signal concerning the ignition timing externally obtained. Then, in the ignition timing control device of the present invention, the ignition timing adjustment device outputs the signal concerning the ignition timing that undergoes adjustment to the switching element for use in discharge which forms the external capacity discharge circuit section, thereby igniting the internal combustion engine with an optimum ignition timing.

As described above, in the ignition timing control device of the present invention, the ignition timing control device can be applied to an engine that is not undergone the knocking control such as the conventional general purpose engine and motorcycle engine. That is, only by adding the ignition timing control device of the present invention to the conventional configuration of the electronic control unit that performs the engine control and connecting the first connecting portion and the second connecting portion of the ignition timing control device to the electronic control unit, redesign to perform the ignition timing control in the electronic control unit is not required. This gives rise to significant effects of greatly reducing work (man-hour) and cost of the redesign. Here, the signal concerning the ignition timing is a signal that includes information about the ignition timing. For instance, it is a reference ignition signal indicating a timing that is a reference of the ignition timing.

In the above invention, it is preferable that the knocking detection device and the ignition timing adjustment device be formed integrally with each other in an unseparatable manner.

Since the knocking detection device and the ignition timing adjustment device are formed integrally with each other in the unseparatable manner, this configuration resists damage and handling becomes easy. Also, this configuration resists receiving external (or outside) noises. Here, the unseparatable manner means that separation between the both devices is impossible unless the devices are broken (because the second configuration is not based on the premise that the devices are separate from each other).

In the above invention, it is preferable that the knocking detection device and the ignition timing adjustment device be fixedly connected so as to be able to be attached to and detached from each other.

The knocking detection device and the ignition timing adjustment device are fixedly connected so as to be able to be attached to and detached from each other. Thus, in a case where either one of the knocking detection device and the ignition timing adjustment device fails, after detaching or separating these devices from each other, only the failed device can be replaced, which is advantage of the present configuration.

In the above invention, it is preferable that the knocking detection device and the ignition timing adjustment device be formed integrally with each other through a connecting cable.

Since the knocking detection device and the ignition timing adjustment device are formed integrally with each other through the connecting cable, it is possible to arrange the knocking detection device and the ignition timing adjustment device with these devices being separated from each other by a length of the connecting cable.

The knocking detection device is usually fixed to a cylinder block etc. of the internal combustion engine, and a temperature of the internal combustion engine is high and the internal combustion engine produces great vibrations. Thus, by arranging the knocking detection device and the ignition timing adjustment device through the connecting cable, influence of heat and vibration (of the internal combustion engine) on the ignition timing adjustment device can be reduced. Hence, it is possible to effectively suppress an occurrence of failure of the ignition timing adjustment device.

In the above invention, it is preferable that the ignition timing adjustment device be installed in the knocking detection device.

Since the ignition timing adjustment device is installed in the knocking detection device in this manner, the device can be formed into a compact shape.

In the above invention, it is preferable that the signal concerning the ignition timing be a reference ignition signal indicating a timing that is a reference of the ignition timing.

With this setting, as the signal concerning the ignition timing, the reference ignition signal (e.g. an after-mentioned ignition signal (A)) can be used.

An ignition system of the present invention comprises: the ignition timing control device of the present invention described above; a control circuit section that outputs a signal concerning an ignition timing of an internal combustion engine; and a capacity discharge circuit section for igniting the internal combustion engine, the capacity discharge circuit section having a capacitor and a switching element for use in discharging electric charge stored in the capacitor, the switching element being driven on the basis of the signal concerning the ignition timing that undergoes adjustment by the ignition timing control device, wherein the first connecting portion and the control circuit section are connected, and the second connecting portion and the switching element of the capacity discharge circuit section are connected.

Since the ignition system of the present invention has the ignition timing control device of the present invention, the ignition system can adjust the ignition timing (correct the ignition timing, e.g. advance or retard the ignition timing) so as to achieve a proper ignition timing. Then, in the ignition timing control device of the present invention, the ignition timing control device outputs the signal concerning the ignition timing that undergoes adjustment to the switching element for use in discharge which forms the capacity discharge circuit section, thereby igniting the internal combustion engine with an optimum ignition timing.

EMBODIMENT 1

Embodiments for Carrying Out the Invention

In the following description, embodiments of an ignition timing control device of the present invention will be explained with reference to the drawings. The ignition timing control device of the present embodiment is a device that is used for various engines (various internal combustion engines) such as the general purpose engine and the motor-cycle engine and controls the ignition timing in order to prevent the knocking of the internal combustion engine. In the following description, the ignition timing control device will be explained with a four-cycle motorcycle engine taken for example.

First, a general system of the internal combustion engine that is provided with the ignition timing control device of the present embodiment will be explained.

Figure 1:
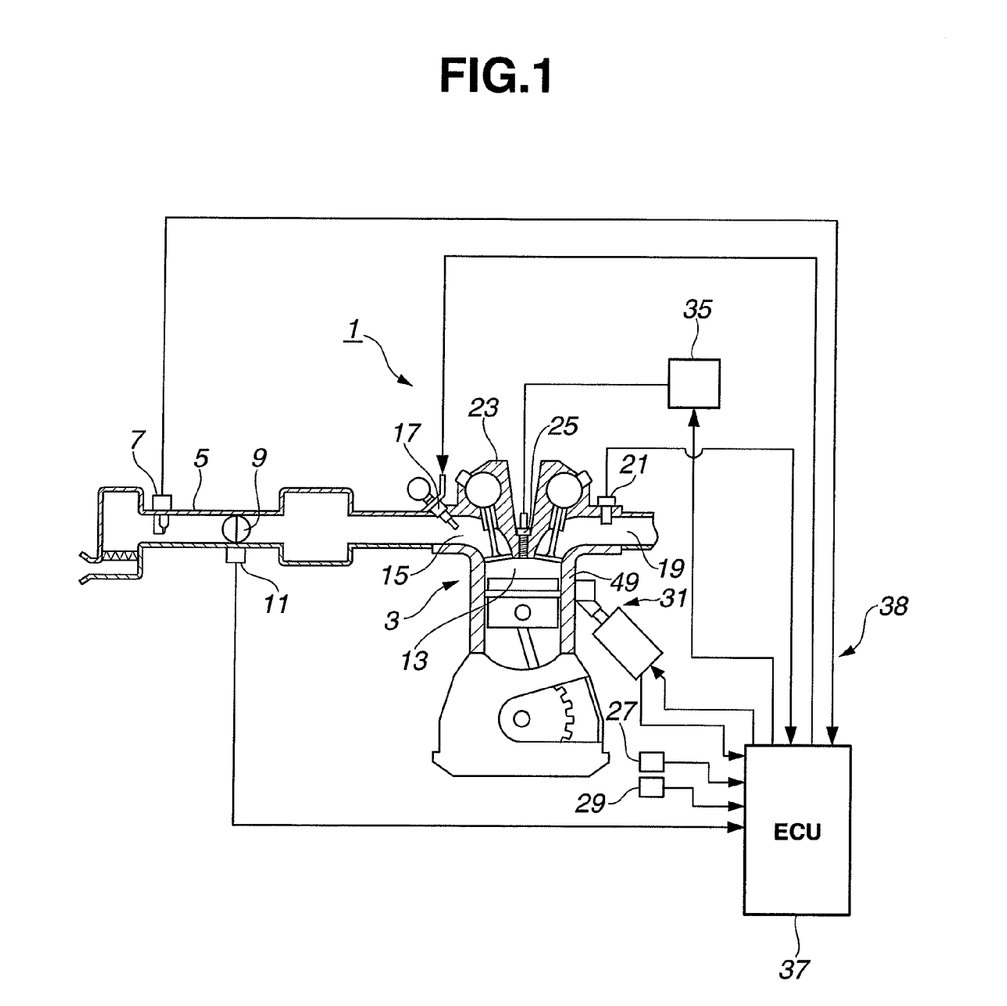
FIG. 1 is an explanatory drawing showing a system configuration of an internal combustion engine in which an ignition timing control device of an embodiment 1 is used.

As shown in FIG. 1, the internal combustion engine 1 mainly has an engine body 3, an intake pipe 5 that introduces air into the engine body 3, an air flow meter 7 that detects a suction air quantity, a throttle valve 9 that regulates the suction air quantity, a throttle opening sensor 11 that detects an opening of the throttle valve 9, an intake manifold 15 that introduces the air into a combustion chamber 13, a fuel injection valve 17 that jets or sprays fuel in the intake manifold 15, an exhaust manifold 19 that exhausts the air (after combustion) from the engine body 3, an air fuel ratio sensor (or an oxygen sensor) 21 that detects an air fuel ratio from the exhaust exhausted from the exhaust manifold 19, etc.

An ignition plug 25 is fixed to a cylinder head 23 of the engine body 3. An engine revolution speed sensor 27 that detects an engine revolution speed (a rotation speed), a crank angle sensor 29 that detects a crank angle, and the like are fixed to the engine body 3.

Further, an after-mentioned ignition timing control device 31 is installed at the engine body 3. This ignition timing control device 31 connects to an ignition coil 35, and the ignition coil 35 connects to the ignition plug 25.

The internal combustion engine 1 is provided with an internal combustion engine control device (an external electronic control) 37 that comprehensively controls an operating condition (e.g. an air fuel ratio feedback control based on the engine revolution speed and an output of the air fuel ratio sensor 21) of the engine body 3 etc. This internal combustion engine control device 37 is an electronic control unit (an engine control unit: ECU) provided with a microcomputer having well-known RAM, ROM, CPU, etc. (all not shown).

Here, this internal combustion engine control device 37 corresponds to an external electronic control unit of the present invention. Further, in the following description, a system having the ignition timing control device 31 and the internal combustion engine control device 37 is called an ignition system 38.

The air flow meter 7, the throttle opening sensor 11, the air fuel ratio sensor 21, the engine revolution speed sensor 27, the crank angle sensor 29 and the ignition timing control device 31, etc. are connected to an input port (not shown) of the internal combustion engine control device 37. And, each signal (such as a sensor signal) from these sensors and device is inputted to the input port of the internal combustion engine control device 37.

The fuel injection valve 17, the ignition timing control device 31, etc. are connected to an output port (not shown) of the internal combustion engine control device 37. And, each control signal to control operation of each device is outputted from the output port of the internal combustion engine control device 37 to these devices.

Figure 2A:
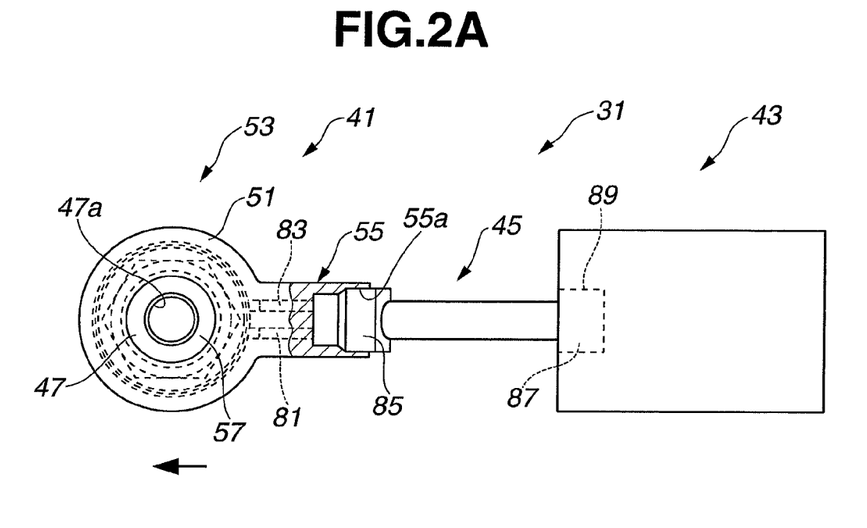
FIG. 2A is a plan view showing the ignition timing control device of the embodiment 1 with a part of the ignition timing control device removed.
Figure 2B:
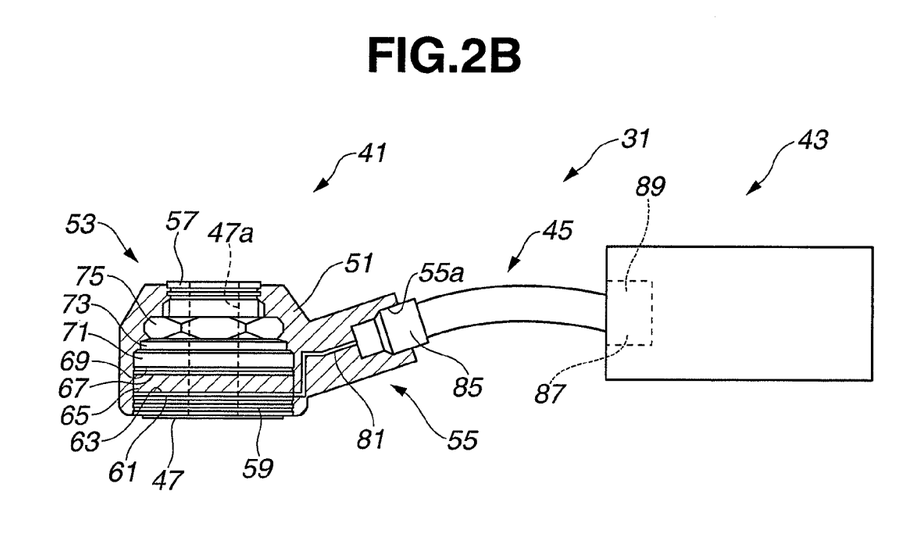
FIG. 2B is a front view showing the ignition timing control device with a part of the ignition timing control device removed.

Next, the ignition timing control device 31 of the present embodiment will be explained. As shown in FIG. 2, the ignition timing control device 31 of the present embodiment is a device formed from a knocking detection device 41 and an ignition timing adjustment device 43 that are formed integrally with each other in an electrically and mechanically unseparatable (undetachable) manner through a connecting cable 45.

The knocking detection device 41 is a non-resonant type knocking sensor using a well-known piezoelectric element 65. The knocking detection device 41 has a structure in which a fixing bolt (not shown) is inserted into an axis hole 47a of amount metal 47, and the knocking detection device 41 is fixed to a cylinder block 49 (see FIG. 1) of the engine body 3 with the fixing bolt.

The knocking detection device 41 is almost entirely molded by a resin molding member 51, and the knocking detection device 41 has a substantially cylindrical body portion 53 and a substantially rectangular parallelepiped connector portion 55 that protrudes from a side surface of the body portion 53.

The body portion 53 has the mount metal 47 that is formed from a cylinder portion 57 having a cylindrical shape and a ring-shaped brim portion 59 provided at one end side of the cylinder portion 57 (at a lower side in FIG. 2B). A ring-shaped first insulating plate 61, a ring-shaped first electrode plate 63, the ring-shaped piezoelectric element 65, a ring-shaped second electrode plate 67, a ring-shaped second insulating plate 69, a ring-shaped weight 71, a ring-shaped disc spring 73 and a ring-shaped nut 75 are disposed at the cylinder portion 57 from a brim portion 59 side. A first output terminal 81 and a second output terminal 83 to take an output signal generated between the both electrode plates 63, 67 are connected to the first electrode plate 63 and the second electrode plate 67 respectively.

The connecting cable 45 is a cable that is provided inside thereof with electrical wirings (not shown) connecting to the first output terminal 81 and the second output terminal 83. A first connecter 85 and a second connecter 87, each of which is connected to the both electrical wirings, are provided at both ends of this connecting cable 45.

The first connecter 85 is fitted or inserted into (or mounted to) an opening 55a of the connector portion 55 of the knocking detection device 41, and the electrical wirings are connected to the respective first and second output terminals 81, 83. The second connecter 87 is fitted or inserted into (or mounted to) a hollow-shaped connecter portion 89 of the ignition timing adjustment device 43, and the electrical wirings are connected to inside wirings (not shown) of the ignition timing adjustment device 43.

In the present embodiment, the first connecter 85 of the connecting cable 45 is configured so that the first connecter 85 is fitted or inserted into (or mounted to) the connector portion 55 of the knocking detection device 41 and also is integrally fixed to the connector portion 55 with an adhesive in the unseparatable (undetachable) manner. The second connecter 87 of the connecting cable 45 is configured so that the second connecter 87 is fitted or inserted into (or mounted to) the connecter portion 89 of the ignition timing adjustment device 43 and also is integrally fixed to the connecter portion 89 with the adhesive in the unseparatable (undetachable) manner.

Next, an electrical configuration of the ignition timing control device 31 will be explained.

Figure 3A:
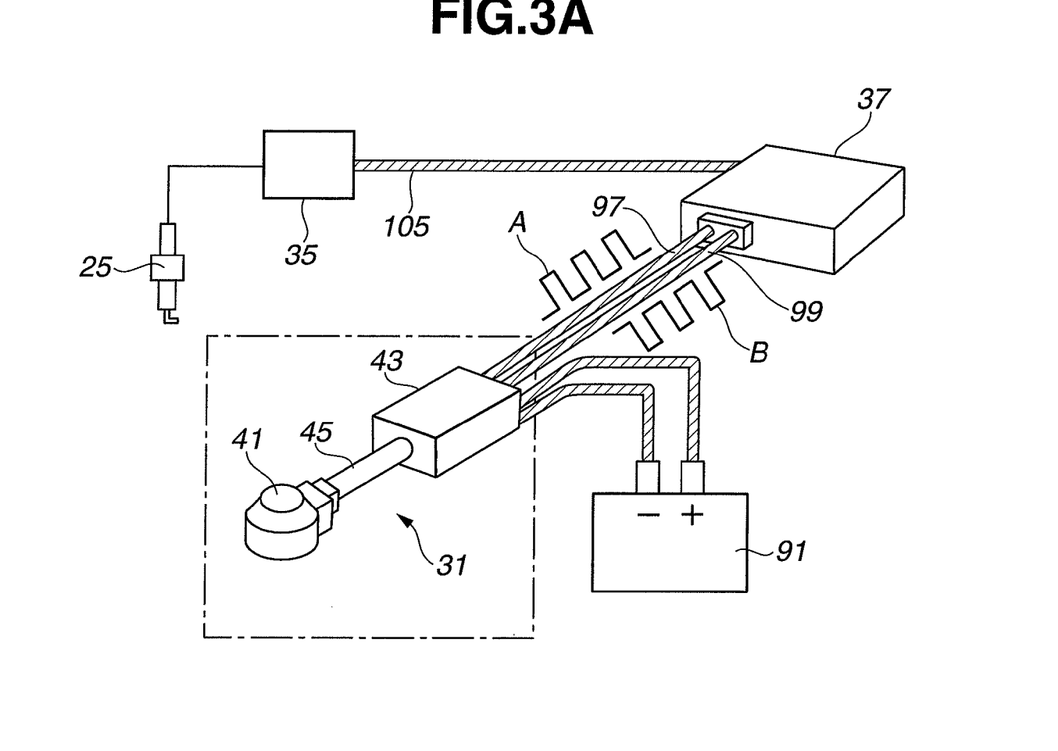
FIG. 3A is an explanatory drawing showing the ignition timing control device and its peripheral devices, of the embodiment 1.
Figure 3B:
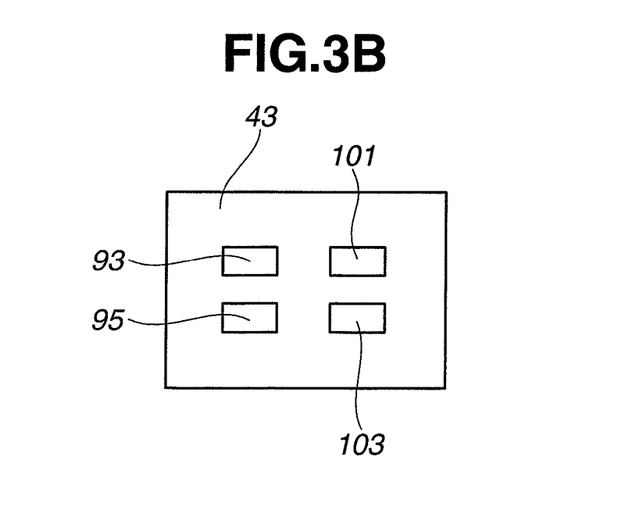
FIG. 3B is an explanatory drawing showing a connection terminal of an ignition timing adjustment device of the ignition timing control device.

As shown in FIG. 3, the ignition timing adjustment device 43 of the ignition timing control device 31 operates by receiving supply of power from a battery 91. Thus the ignition timing adjustment device 43 is provided with a pair of power supply terminals 93, 95 for receiving the power from the battery 91.

The ignition timing adjustment device 43 is connected to the internal combustion engine control device 37 through a set of lead wires (signal wires) 97, 99 so as to be able to be attached to and detached from the internal combustion engine control device 37. The lead wires 97, 99 can be attached to and detached from each of the ignition timing adjustment device 43 and the internal combustion engine control device 37.

The ignition timing adjustment device 43 has a reception terminal 101 to receive an after-mentioned reference ignition signal (A) from the internal combustion engine control device 37 and an ignition terminal 103 that is connected to a thyristor 376 in a capacity discharge circuit section 373 and outputs an after-mentioned (post-adjustment) correction ignition signal (B). The internal combustion engine control device 37 is connected to the ignition coil 35 through a lead wire 105.

Figure 4:
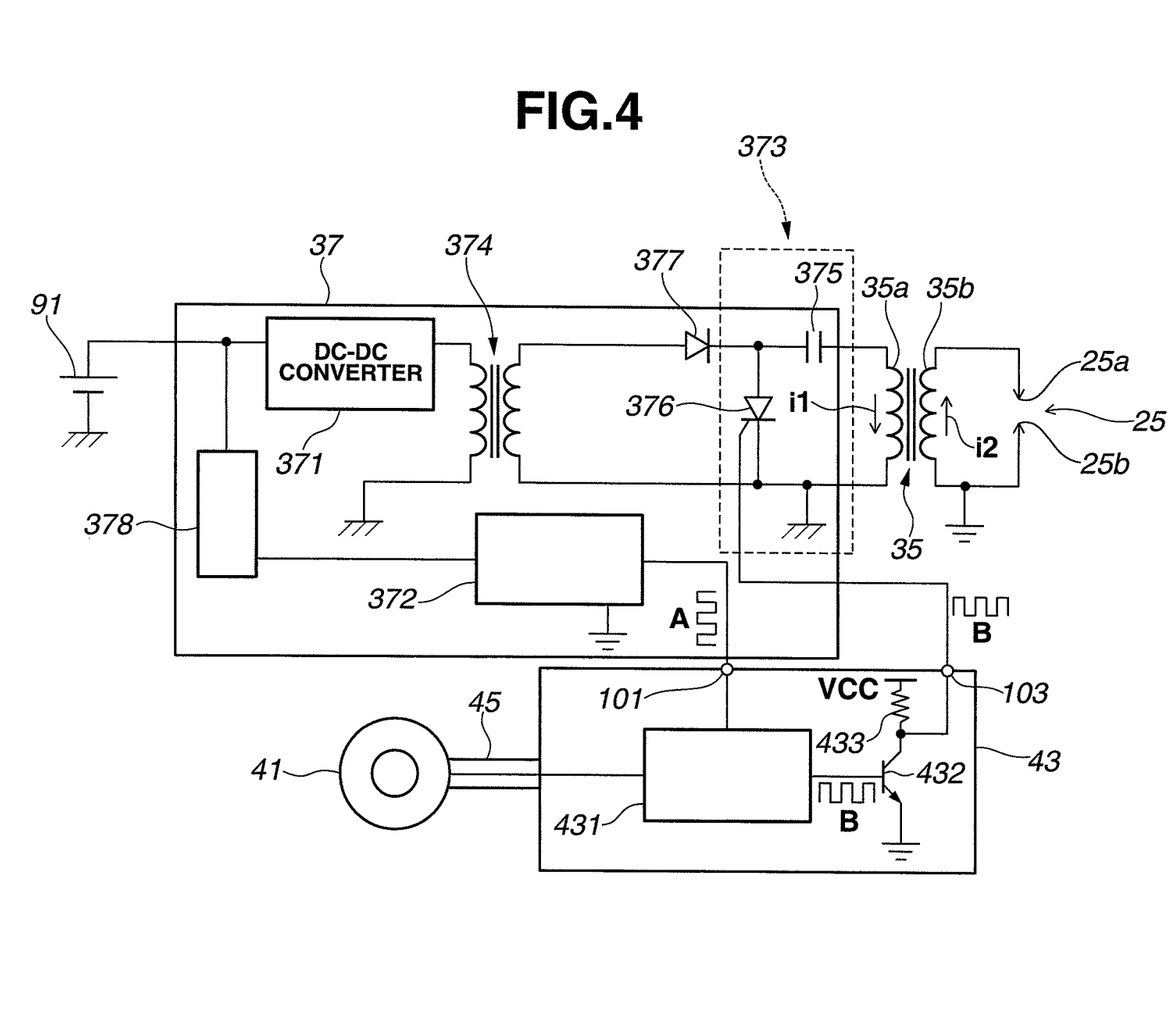
FIG. 4 is an explanatory drawing showing an electrical configuration of the ignition timing control device and its peripheral devices of the embodiment 1.

As shown in FIG. 4, the internal combustion engine control device 37 mainly has a DC-DC converter 371, a CDI-side control section (a control circuit section) 372, the capacity discharge circuit section 373 and a regulator 378. The DC-DC converter 371 is an element that transforms DC voltage supplied from the battery 91. As the DC-DC converter 371, a well-known converter can be used. The DC-DC converter 371 transforms the DC voltage by well-known working and supplies it to a transformer coil 374. Further, voltage outputted from the transformer coil 374 is supplied to a capacitor 375 through a diode 377, then the capacitor 375 is charged.

The CDI-side control section 372 is configured to input power supply voltage through the regulator 378. The CDI-side control section 372 is an MCU (Micro Control Unit) that outputs the reference ignition signal (A) on the basis of a signal inputted from the engine revolution speed sensor 27 and showing a revolution speed of the internal combustion engine 1, a signal inputted from the crank angle sensor 29 and showing the crank angle, a signal inputted from the throttle opening sensor 11 and showing the opening of the throttle valve and so on. The CDI-side control section 372 is connected to an adjustment-side control section 431 of the ignition timing adjustment device 43 so as to be able to transmit the reference ignition signal (A) to the adjustment-side control section 431.

The internal combustion engine control device 37 is connected to a primary winding 35a of the ignition coil 35. The internal combustion engine control device 37 has the capacity discharge circuit section 373 having the capacitor 375 and the thyristor 376. The capacity discharge circuit section 373 is connected to the primary winding 35a, and forms a capacity discharge closed circuit including the primary winding 35a.

The capacitor 375 is a capacitor that temporarily stores power that is energized to the ignition coil 35. One terminal of the capacitor 375 is connected to the transformer coil 374 through the diode 377, and the other terminal is connected to the primary winding 35a of the ignition coil 35.

The thyristor 376 is a switching element for use in discharge which performs switching-on/off of current-carry to the primary winding 35a from the capacitor 375. An anode of the thyristor 376 is connected to the one terminal of the capacitor 375, and a cathode of the thyristor 376 is earthed to a ground, which is the same electric potential as a negative electrode of the battery 91. Further, a gate of the thyristor 376 is connected to the ignition terminal 103 of the ignition timing adjustment device 43.

The ignition timing adjustment device 43 mainly has the adjustment-side control section 431 and a switching transistor 432. The adjustment-side control section 431 determines the correction ignition signal (B) by calculation on the basis of at least the reference ignition signal (A) and a knocking signal. As same as the internal combustion engine control device 37, the adjustment-side control section 431 is an electronic control unit provided with a microcomputer having well-known RAM, ROM, CPU, etc. (all not shown). Regarding a calculation manner of the correction ignition signal (B), it will be explained later. This adjustment-side control section 431 is connected to the internal combustion engine control device 37 through the reception terminal 101.

The switching transistor 432 is an element that controls drive of the thyristor 376 on the basis of the correction ignition signal (B) determined by the adjustment-side control section 431. A collector of the switching transistor 432 is connected to the gate of the thyristor 376 through the ignition terminal 103, and also is connected to a resistance 433 to which power supply voltage (VCC) is applied. A base of the switching transistor 432 is connected to the adjustment-side control section 431, and inputs the correction ignition signal (B). An emitter of the switching transistor 432 is earthed to the ground, which is the same electric potential as the negative electrode of the battery 91.

The ignition coil 35 has the primary winding 35a and a secondary winding 35b, and one end of the primary winding 35a is connected to the capacitor 375 of the internal combustion engine control device 37, and the other end is connected to the cathode of the thyristor 376.

One end of the secondary winding 35b is earthed to the ground, which is the same electric potential as the negative electrode of the battery 91. The other end of the secondary winding 35b is connected to a center electrode 25a of the ignition plug 25. A ground electrode 25b of the ignition plug 25 is earthed to the ground, which is the same electric potential as the negative electrode of the battery 91.

Next, a basic operation of the ignition timing control using the ignition timing control device 31 described above will be explained. The internal combustion engine control device 37 determines a reference ignition timing that becomes a reference of the ignition timing on the basis of, for instance, the engine revolution speed and/or the suction air quantity. This reference ignition timing is a base ignition timing (namely an ignition timing that is an object of the adjustment by the ignition timing adjustment device 43, i.e. the ignition timing that undergoes the adjustment by the ignition timing adjustment device 43) that is set, using a map in which a plurality of ignition timings having such adequate margin that the internal combustion engine 1 is not broken or damaged even when taking account of variations of each internal combustion engine 1 and climatic change etc. are set for each operating condition of the internal combustion engine 1, by comparing a current operating condition with this map (by checking a current operating condition against this map).

Figure 5:
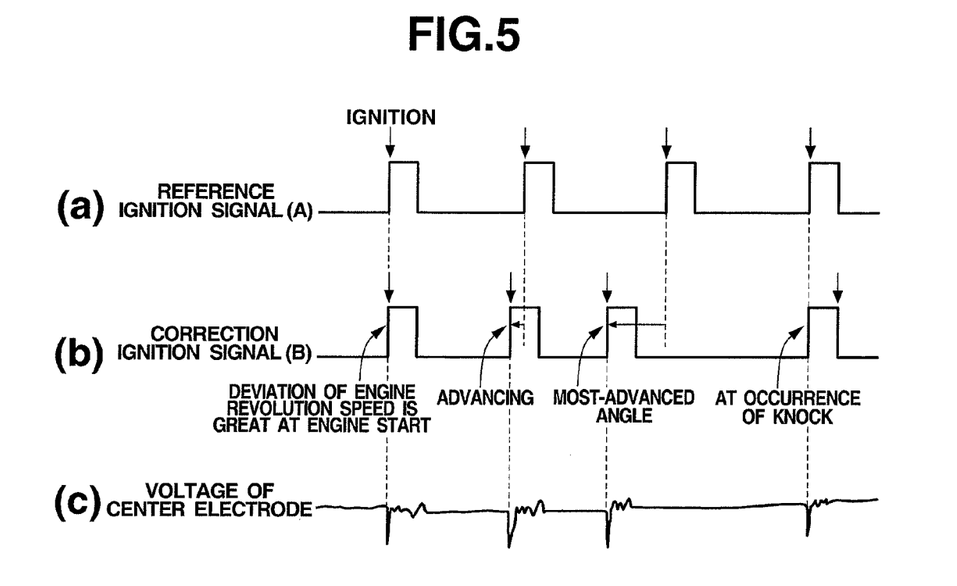
FIG. 5 is an explanatory drawing showing a relationship between a reference ignition signal, a correction ignition signal and a voltage of a center electrode.

Here, a signal that indicates this reference ignition timing is a reference ignition signal (i.e. the reference ignition signal (A): see FIG. 5 (*a*)). This reference ignition signal (A) is outputted from the CDI-side control section 372 to the adjustment-side control section 431 of the ignition timing adjustment device 43.

The adjustment-side control section 431 that receives the reference ignition signal (A) receives a signal (a knocking signal) from the knocking detection device 41, and detects the presence or absence of an occurrence of the knocking (a knock) on the basis of the knocking signal. The adjustment-side control section 431 judges the presence or absence of the knocking on the basis of, for instance, a magnitude or level of a peak value of the knocking signal.

Then, the adjustment-side control section 431 adjusts (corrects) the ignition timing in accordance with a knocking occurrence state etc., and determines a correction ignition timing. A signal that indicates this correction ignition timing is a correction ignition signal (i.e. the correction ignition signal (B): see FIG. 5 (*b*)).

Figure 6:
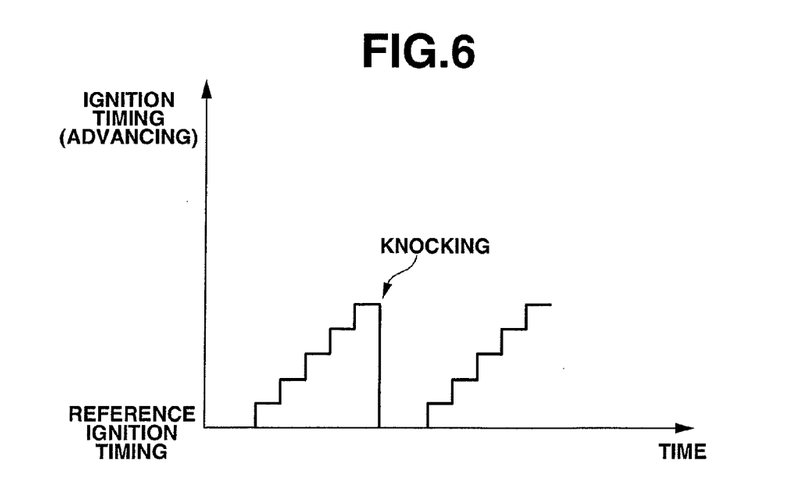
FIG. 6 is a graph showing a state of adjustment of an ignition timing by advancing and retarding the ignition timing.

More specifically, as shown in FIG. 6, the correction ignition timing is set so that when the knocking does not occur, the ignition timing is gradually advanced to a most-advanced angle at a predetermined time interval, and when the knocking occurs, the ignition timing is returned to the reference ignition timing. Here, as shown in FIG. 5, in a case where a change of the engine revolution speed is great, e.g. in transition of the engine condition such as during an engine start and acceleration, the operation correcting the ignition timing is not carried out.

Subsequently, when the correction ignition timing is determined as described above, as shown in FIG. 4, the correction ignition signal (B) is outputted from the adjustment-side control section 431 to the switching transistor 432. When the correction ignition signal (B) is provided to the base of the switching transistor 432, the switching operation is performed according to ON/OFF of this correction ignition signal (B).

As will be explained in detail, in a case where the correction ignition signal (B) is OFF (a low level: generally, a ground potential), a base current does not flow and the switching transistor 432 is in an OFF state (a cutoff state). Then, the current does not flow to the gate of the thyristor 376 connecting to the collector of the switching transistor 432.

On the other hand, in a case where the correction ignition signal (B) is ON (a high level: a state in which a positive voltage is applied from the adjustment-side control section 431), the base current flows and the switching transistor 432 is in an ON state (a current-carrying state). Then, the current also flows to the gate of the thyristor 376 connecting to the collector of the switching transistor 432, and the thyristor 376 is in a current-carrying state (an ON state), and electric charge stored in the capacitor 375 is thus instantly discharged to the primary winding 35*a*.

Then, since an ignition voltage is produced at the secondary winding 35*b* of the ignition coil 35, spark discharge occurs between the center electrode 25*a* and the ground electrode 25*b* of the ignition plug 25, and mixture sucked into the internal combustion engine 1 is ignited (see FIG. 5(*c*)). Current that flows in the secondary winding 35*b* at this time is a secondary current i2.

Here, as a characteristic of the thyristor 376, the thyristor 376 keeps ON regardless of the presence or absence of the gate signal while current of a predetermined current value or greater flows between the anode and the cathode of the thyristor 376. Then, when the electric charge stored in the capacitor 375 is discharged to the primary winding 35*a* and no electric charge of the capacitor 375 remains then a primary current i1 does not flow, the thyristor 376 automatically goes into a no-current-carrying state (an OFF state).

The reference ignition signal (A) and the correction ignition signal (B) each include information of a timing of change from the low level to the high level and a timing of change from the high level to the low level. The timing of change from the low level to the high level corresponds to a timing when the electric charge stored in the capacitor 375 is instantly discharged to the primary winding 35*a*, and this is a desired ignition timing (a timing at which the ignition plug 25 ignites).

Since the current-carrying state and the cutoff state of the switching transistor 432 are controlled according to the high level and the low level of the correction ignition signal (B), the correction ignition signal (B) is outputted from the ignition terminal 103 of the ignition timing adjustment device 43. Here, in the present invention, the signal outputted from the ignition terminal 103 according to the high level and the low level of the correction ignition signal (B) generically corresponds to a signal (the correction ignition signal (B)) concerning an ignition time that undergoes the adjustment, which is outputted from the ignition terminal 103 (a second connecting portion).

Next, an operation executed in the ignition timing adjustment device 43 will be explained.

<Correction Ignition Timing Calculating Operation>

This operation is an operation in which the correction ignition timing is calculated on the basis of the reference ignition signal (A) and also the engine revolution speed is calculated using the reference ignition signal (A).

Figure 7:
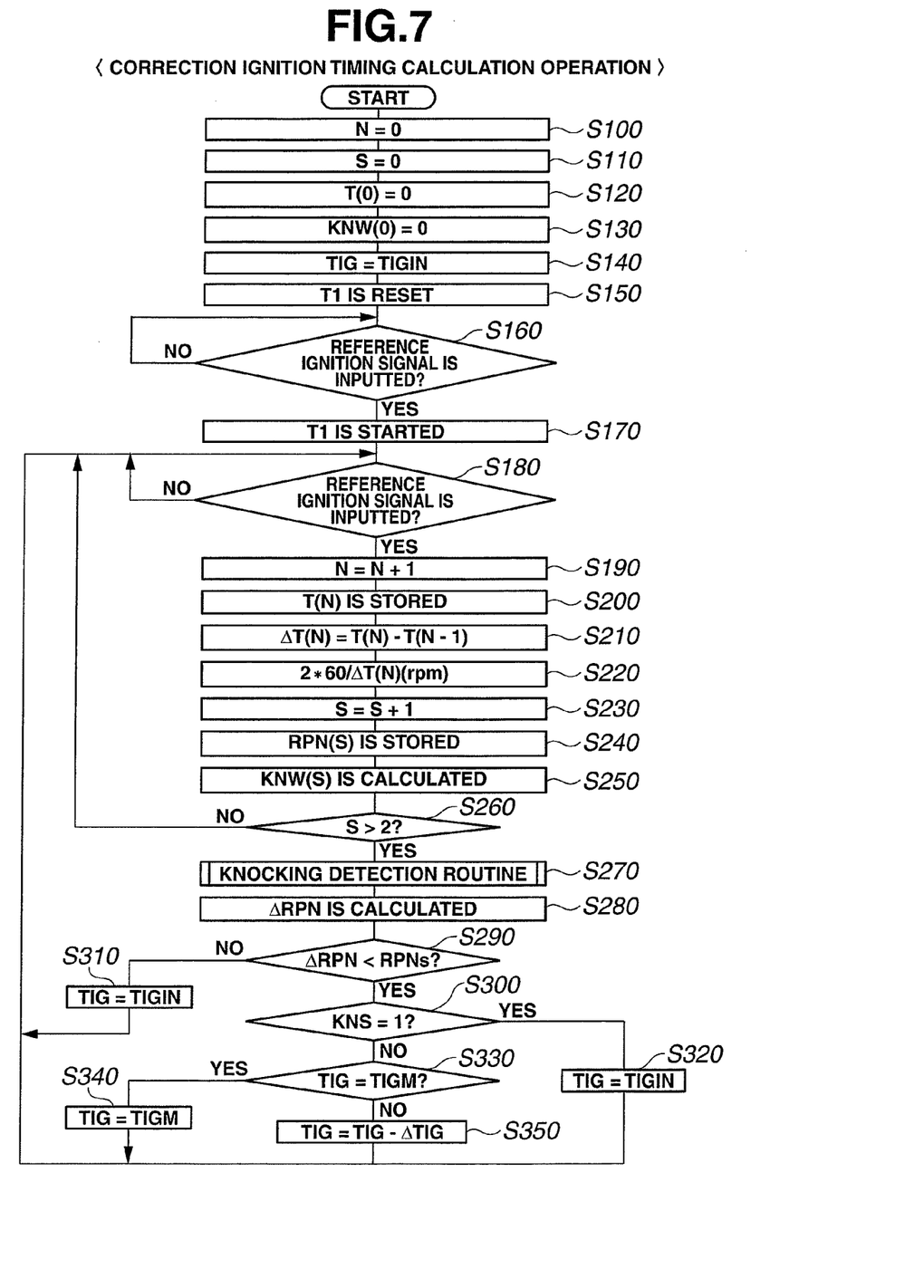
FIG. 7 is a flow chart showing a correction ignition timing calculating operation executed in the ignition timing adjustment device of the embodiment 1.

As shown in a flow chart in FIG. 7, at step S100, a timer memory variable N is reset (is set to 0).

At step S110, a revolution speed store/knock window (Window) variable S is reset. This revolution speed store/knock window variable S is a variable that indicates a time series when the engine revolution speed is stored in sequence at step S240 and also a variable that indicates a time series when a value of a crank angle window that detects the knocking is stored in sequence at step S250.

At subsequent step S120, an initial value T(0) of a timer T is set to 0.

At subsequent step S130, an initial value KNW(0) of a knock detection window KNW is set to 0. This knock detection window KNW indicates an area or a region (a predetermined rotation angle range or section) where there is a possibility that the knocking will occur, and the knock detection window KNW corresponds to a certain period that is set with the ignition timing being a starting point and corresponds to an analysis section of the knocking signal.

At subsequent step S140, on the basis of the reference ignition signal (A) received from the CDI-side control section 372 of the internal combustion engine control device 37, a reference ignition timing (an input ignition timing) TIGIN is set as a correction ignition timing TIG. Here, the correction ignition timing TIG here is a value that is not corrected yet.

At subsequent step S150, an ignition signal interval measurement timer T1 is reset.

At subsequent step S160, a judgment is made as to whether or not the reference ignition signal (A) is inputted. If an affirmative judgment is given here, the routine proceeds to step S170. If a negative judgment is given, the routine stands by here.

At step S170, in order to measure a time from the input of the reference ignition signal (A), the ignition signal interval measurement timer T1 is started.

At subsequent step S180, a judgment is made as to whether or not the reference ignition signal (A) is inputted again. If an affirmative judgment is given here, the routine proceeds to step S190. If a negative judgment is given, the routine stands by here.

At step S190, since the reference ignition signal (A) is inputted, count-up of the timer memory variable N is performed.

At subsequent step S200, a time when the reference ignition signal (A) is inputted this time (Nth) is stored as a timer T(N). That is, a count value of the ignition signal interval measurement timer T1 is stored as a value of the timer T(N).

At subsequent step S210, a difference ΔT(N) between the time (T(N)) when the reference ignition signal (A) is inputted this time (Nth) and a time (T(N−1)) when the reference ignition signal (A) is (was) inputted last time (N−1th) is determined. That is, a time between successive reference ignition signals (A) is determined.

At subsequent step S220, the engine revolution speed (rpm) is calculated by calculation of "2 rotations×60 sec/ΔT(N)" (in a case of 1 ignition/2 rotations in the four-cycle engine).

At subsequent step S230, count-up of the revolution speed store/knock window variable S is performed.

At subsequent step S240, the engine revolution speed calculated at step S220, namely the engine revolution speed corresponding to the revolution speed store/knock window variable S, is stored (memorized) as an RPN(S).

At subsequent step S250, calculation of the knock detection window KNW(S) is performed. That is, calculation of the knock detection window KNW(S) corresponding to the revolution speed store/knock window variable S is performed by a well-known calculating method, and its value is stored.

At subsequent step S260, a judgment is made as to whether or not the revolution speed store/knock window variable S is greater than 2. If an affirmative judgment is given here, the routine proceeds to step S270. If a negative judgment is given, the routine is returned to step S180.

At step S270, an after-mentioned knocking detection operation is executed, and the knocking is detected.

At subsequent step S280, a deviation of the engine revolution speed (a revolution speed deviation) ΔRPN that indicates a magnitude of the change of the engine revolution speed is calculated by calculation of "RPNS (S)/RPNS(S−1)" of the engine revolution speed, namely by dividing the engine revolution speed RPNS(S) this time (Sth) by the engine revolution speed RPNS (S−1) last time (S−1th).

At subsequent step S290, a judgment is made as to whether or not the revolution speed deviation ΔRPN is smaller than a predetermined judgment value (a predetermined criteria) RPNs. If an affirmative judgment is given here, the routine proceeds to step S300. If a negative judgment is given, the routine proceeds to step S310.

At step S310, since the revolution speed deviation ΔRPN is great and the advancing of the ignition timing is not proper, the reference ignition timing TIGIN in itself is set as the correction ignition timing TIG, and the routine is returned to step S180.

On the other hand, at step S300, a judgment is made as to whether or not the knocking occurs according to whether or not an after-mentioned knock detection flag KNS that is set in the knocking detection operation is 1. If an affirmative judgment is given here, the routine proceeds to step S320. If a negative judgment is given, the routine proceeds to step S330.

At step S320, since the knocking occurs, in order to prevent the occurrence of the knocking, the ignition timing is retarded. More specifically, the reference ignition timing TIGIN in itself is set as the correction ignition timing TIG (see FIG. 6), and the routine is returned to step S180.

On the other hand, at step S330, since the knocking does not occur, a judgment is made as to whether or not the ignition timing (the correction ignition timing TIG) is a most-advanced angle TIGM. If an affirmative judgment is given here, the routine proceeds to step S340. If a negative judgment is given, the routine proceeds to step S350.

At step S340, since the correction ignition timing TIG is the most-advanced angle TIGM, a value of the most-advanced angle TIGM is set as a value of the correction ignition timing TIG, and the routine is returned to step S180. On the other hand, at step S350, since the correction ignition timing TIG is not the most-advanced angle TIGM, the ignition timing is advanced by a predetermined value ΔTIG. More specifically, by subtracting the predetermined value (a correction advancing value) ATIG from the correction ignition timing TIG, this ignition timing is set as the correction ignition timing TIG this time, and the routine is returned to step S180.

<Knocking Detection Operation>

This operation is an operation in which the knocking is detected on the basis of the knocking signal. This process is performed at a predetermined time interval.

Figure 8:
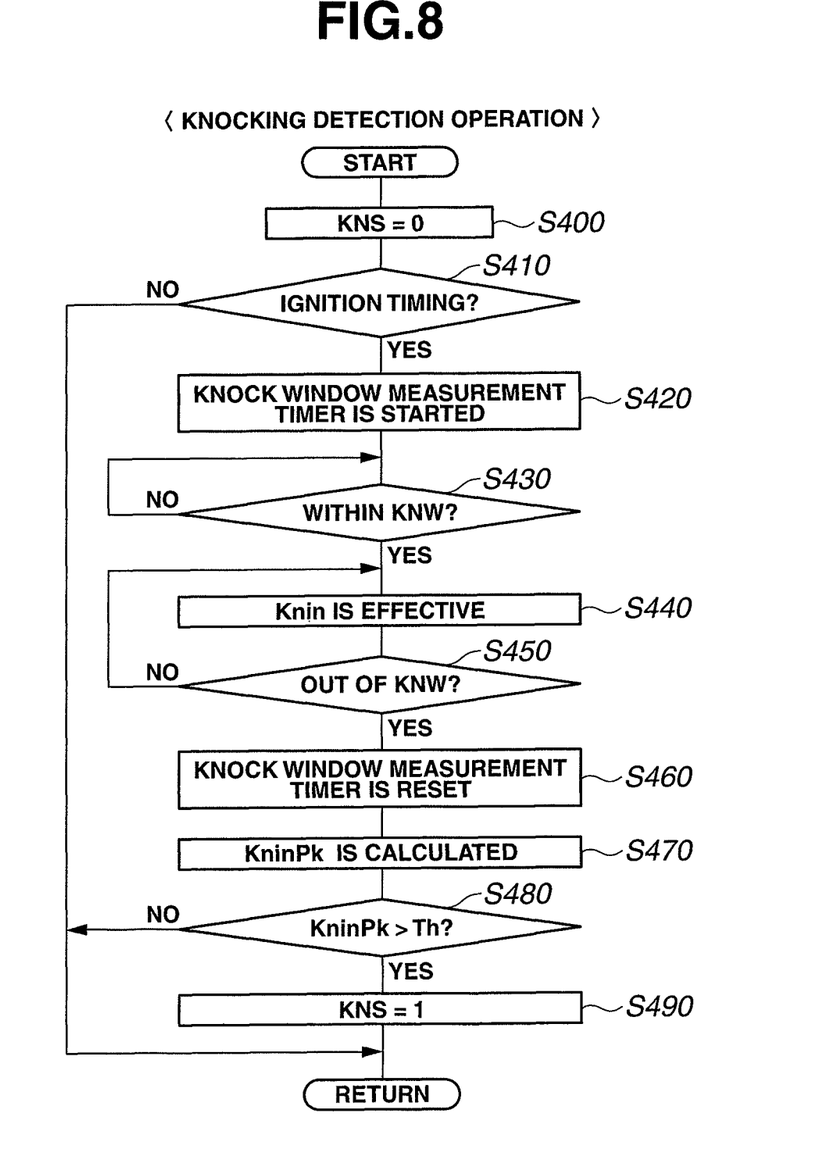
FIG. 8 is a flow chart showing a knocking detecting operation executed in the ignition timing adjustment device of the embodiment 1.

As shown in FIG. 8, at step S400, the knock detection flag KNS is cleared (is set to 0).

At subsequent step S410, a judgment is made as to whether or not this point (present time) is the ignition timing (whether or not this point (present time) is the timing at which the ignition signal is changed from the low level to the high level). If an affirmative judgment is given here, the routine proceeds to step S420. If a negative judgment is given, the present operation is temporarily terminated.

At step S420, a knock detection window measurement timer is started.

At subsequent step S430, a judgment is made as to whether or not this point (present time) is within a period corresponding to the knock detection window KNW calculated at step S250 (in other words, whether or not this point is in the knock detection window KNW) on the basis of a value of the knock window measurement timer. If an affirmative judgment is given here, the routine proceeds to step S440. If a negative judgment is given, the routine is returned to step S430 and the same operation is repeated.

At step S440, the knocking signal obtained from the knocking detection device 41 is set as a valid or effective signal.

At subsequent step S450, a judgment is made as to whether or not the period corresponding to the knock detection window KNW calculated at step S250 passes (or elapses) (in other words, whether or not this point is out of the knock detection window KNW) on the basis of the value of the knock window measurement timer. If an affirmative judgment is given here, the routine proceeds to step S460. If a negative judgment is given, the routine is returned to step S440 and the same operation is repeated.

At step S460, the knock window measurement timer is reset.

At subsequent step S470, a peak value KninPk of the knocking signal is calculated.

At subsequent step S480, a judgment is made as to whether or not the peak value KninPk of the knocking signal is greater than a predetermined judgment value (a predetermined criteria) Th that is set for judgment of the presence or absence of the knocking, namely that a judgment is made as to whether or not the knocking occurs. If an affirmative judgment is given here, the routine proceeds to step S490. If a negative judgment is given, the present operation is temporarily terminated.

At step S490, since the knocking occurs, the knock detection flag KNS is set (is set to 1), which indicates that the knocking occurs, and the present operation is terminated. Next, effects of the present embodiment will be explained. In the present embodiment, the ignition timing control device 31 is configured so that the knocking detection device 41 and the ignition timing adjustment device 43 are electrically connected and formed integrally with each other through the connecting cable 45. And also, the knocking signal is inputted to the ignition timing adjustment device 43 from the knocking detection device 41, and the reference ignition timing (the reference ignition signal) (A) is inputted to the ignition timing adjustment device 43 from the external internal combustion engine control device 37.

Therefore, the ignition timing adjustment device 43 can correct the ignition timing by advancing or retarding the ignition timing so as to achieve the proper ignition timing on the basis of the knocking signal obtained from the knocking detection device 41 and the reference ignition timing (the reference ignition signal) (A) obtained from the internal combustion engine control device 37. Then, the ignition timing adjustment device 43 outputs the correction ignition signal (B) to the thyristor 376 forming the capacity discharge circuit section 373 of the internal combustion engine control device 37, thereby igniting the internal combustion engine with an optimum ignition timing.

Further, the configuration of the present embodiment can be achieved by fixing the knocking detection device 41 to the cylinder block 49 of the internal combustion engine 1 and electrically connecting the ignition timing adjustment device 43 and the internal combustion engine control device 37. Thus, also from the viewpoint of this configuration, this has the advantage of easily adding the ignition timing control device 31 to the conventional device configuration.

Furthermore, in the present embodiment, the knocking detection device 41 and the ignition timing adjustment device 43 are formed integrally with each other in the unseparatable (undetachable) manner. Thus, this configuration resists damage and handling becomes easy. Also, this configuration resists receiving external (or outside) noises.

Moreover, in the present embodiment, since the knocking detection device 41 and the ignition timing adjustment device 43 are formed integrally with each other through the connecting cable 45, it is possible to arrange the knocking detection device 41 and the ignition timing adjustment device 43 with these devices being separated from each other by a length of the connecting cable 45.

That is, in the present embodiment, the ignition timing adjustment device 43 can be arranged with the ignition timing adjustment device 43 being separated from the knocking detection device 41 that is fixed to the cylinder block 49. Influence of heat and vibration (of the engine body 3) on the ignition timing adjustment device 43 can therefore be reduced. Hence, it is possible to effectively suppress an occurrence of failure of the ignition timing adjustment device 43.

EMBODIMENT 2

Next, an embodiment 2 will be explained. Regarding descriptions that are same as those of the embodiment 1, their explanations are omitted here.

Figure 9A:
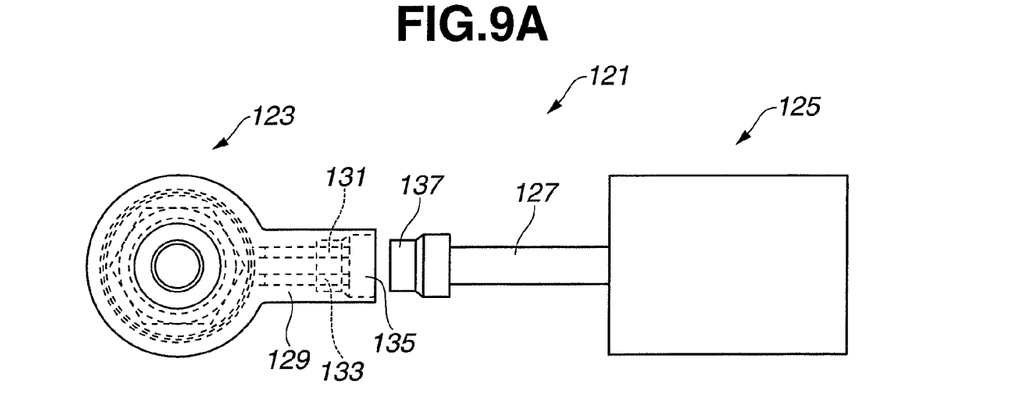
FIG. 9A is a plan view showing an ignition timing control device of an embodiment 2.

As shown in FIG. 9A, as same as the embodiment 1, an ignition timing control device 121 of the present embodiment is formed from a knocking detection device 123, an ignition timing adjustment device 125 and a connecting cable 127 (that connects these devices) which are fixedly connected each other.

Especially in the present embodiment, although the ignition timing adjustment device 125 and the connecting cable 127 are formed integrally with each other in the unseparatable (undetachable) manner, as shown in the drawing, the knocking detection device 123 and the connecting cable 127 are fixedly connected so as to be able to be attached to and detached from each other.

That is, a connecter portion 129 of the knocking detection device 123 is provided with a hollow portion 135 in which first and second output terminals 131, 133 are exposed, and this hollow portion 135 and a first connector portion 137 of the connecting cable 127 are connected so as to be able to be attached to and detached from each other. With this configuration, the knocking detection device 123 and the ignition timing adjustment device 125 are fixedly connected so as to be able to be attached to and detached from each other.

The present embodiment also has the same effects as the embodiment 1. Further, in the present embodiment, the knocking detection device 123 and the ignition timing adjustment device 125 are fixedly connected so as to be able to be attached to and detached from each other. Thus, in a case where either one of the knocking detection device 123 and the ignition timing adjustment device 125 fails, after detaching or separating these devices from each other, only the failed device can be replaced, which is advantage of the present embodiment.

EMBODIMENT 3

Next, an embodiment 3 will be explained. Regarding descriptions that are same as those of the embodiment 2, their explanations are omitted here.

Figure 9B:
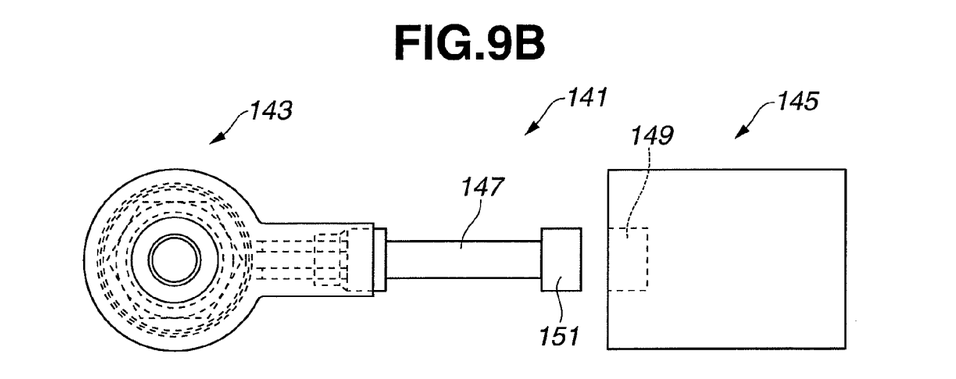
FIG. 9B is a plan view showing an ignition timing control device of an embodiment 3.

As shown in FIG. 9B, as same as the embodiment 1, an ignition timing control device 141 of the present embodiment is formed from a knocking detection device 143, an ignition timing adjustment device 145 and a connecting cable 147 (that connects these devices) which are fixedly connected each other.

Especially in the present embodiment, although the knocking detection device 143 and the connecting cable 147 are formed integrally with each other in the unseparatable (undetachable) manner, as shown in the drawing, the ignition timing adjustment device 145 and the connecting cable 147 are fixedly connected so as to be able to be attached to and detached from each other.

That is, the ignition timing adjustment device 145 is provided with a hollow-shaped connector portion 149, and this connector portion 149 and a second connector portion 151 of the connecting cable 147 are connected so as to be able to be attached to and detached from each other. With this configuration, the knocking detection device 143 and the ignition timing adjustment device 145 are fixedly connected so as to be able to be attached to and detached from each other.

The present embodiment also has the same effects as the embodiment 2.

EMBODIMENT 4

Next, an embodiment 4 will be explained. Regarding descriptions that are same as those of the embodiment 2, their explanations are omitted here.

Figure 9C:
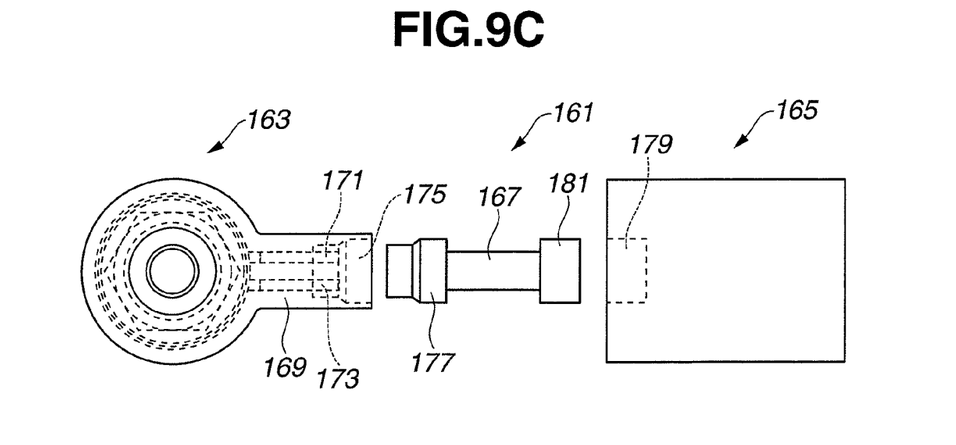
FIG. 9C is a plan view showing an ignition timing control device of an embodiment 4.

As shown in FIG. 9C, as same as the embodiment 1, an ignition timing control device 161 of the present embodiment is formed from a knocking detection device 163, an ignition timing adjustment device 165 and a connecting cable 167 (that connects these devices) which are fixedly connected each other.

Especially in the present embodiment, the knocking detection device 163 and the connecting cable 167 are fixedly connected so as to be able to be attached to and detached from each other. And also, the ignition timing adjustment device 165 and the connecting cable 167 are fixedly connected so as to be able to be attached to and detached from each other. That is, as same as the embodiment 2, a connecter portion 169 of the knocking detection device 163 is provided with a hollow portion 175 in which first and second output terminals 171, 173 are exposed, and this hollow portion 175 and a first connector portion 177 of the connecting cable 167 are connected so as to be able to be attached to and detached from each other.

Further, the ignition timing adjustment device 165 is provided with a hollow-shaped connector portion 179, and this connector portion 179 and a second connector portion 181 of the connecting cable 167 are connected so as to be able to be attached to and detached from each other.

As described above, the ignition timing control device 161 of the present embodiment has a configuration in which the knocking detection device 163 and the ignition timing adjustment device 165 are fixedly connected so as to be able to be attached to and detached from each other.

The present embodiment also has the same effects as the embodiment 2.

EMBODIMENT 5

Next, an embodiment 5 will be explained. Regarding descriptions that are same as those of the embodiment 1, their explanations are omitted here.

Figure 10A:
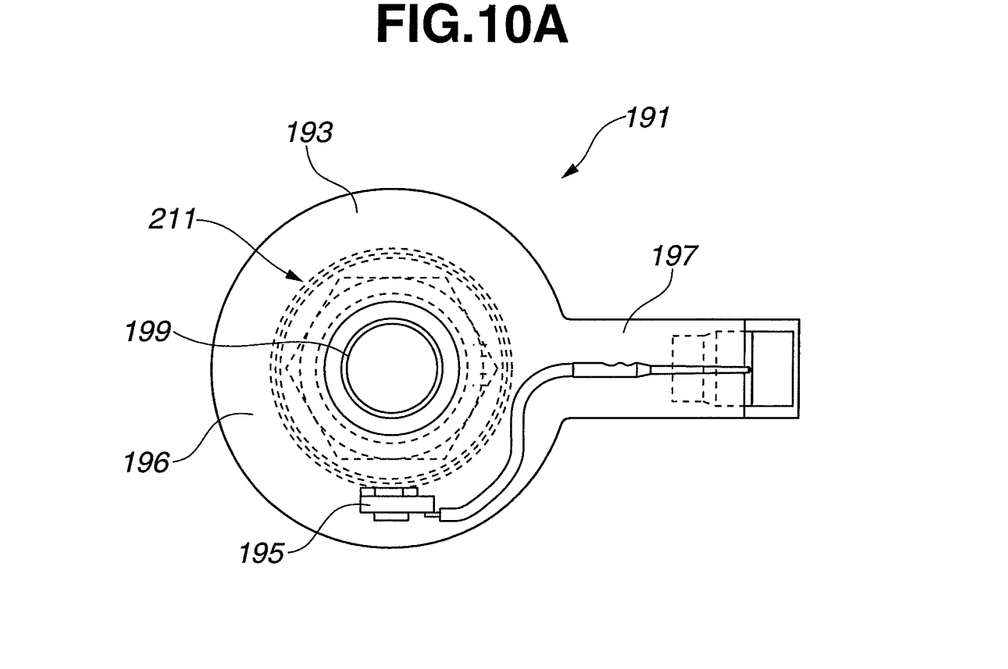
FIG. 10A is a plan view showing an ignition timing control device of an embodiment 5.
Figure 10B:
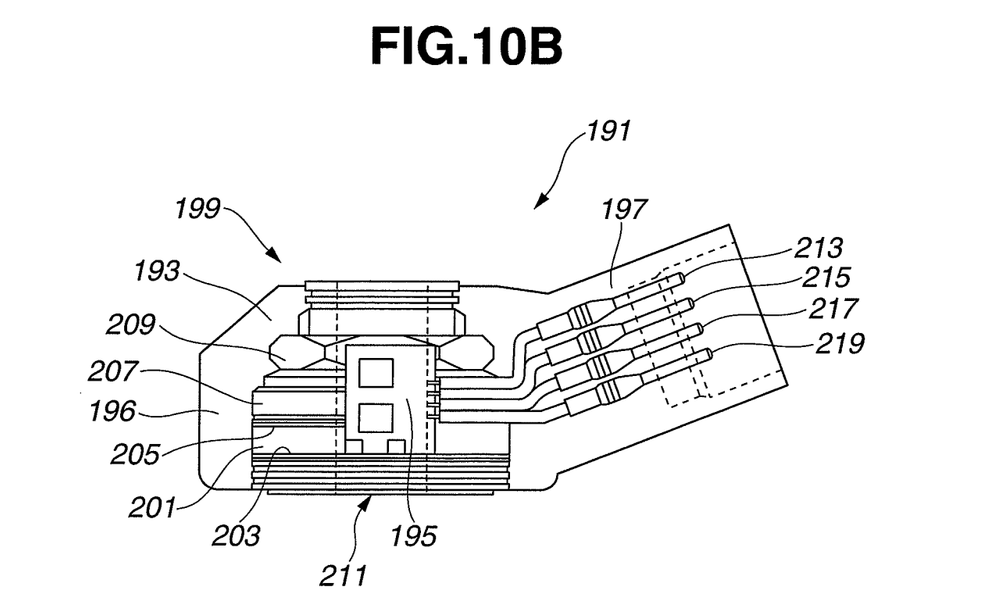
FIG. 10B is a front view of the ignition timing control device.

As shown in FIG. 10, as same as the embodiment 1, an ignition timing control device 191 of the present embodiment has a knocking detection device 193. However, the ignition timing control device 191 has no connecting cable, and an ignition timing adjustment device 195 is installed inside the knocking detection device 193. Here, FIG. 10 shows an inside configuration with a resin mold being transparent.

As will be explained in detail, as same as the embodiment 1, the ignition timing control device 191 of the present embodiment has a body portion 196 and a connector portion 197 of the knocking detection device 193. In addition, the ignition timing control device 191 accommodates, in a resin-molded inside of the body portion 196, a functioning portion 211 where a piezoelectric element 201, a pair of electrode plates 203, 205, a weight 207, a nut 209, etc. are fitted to a mount metal 199. Then, the ignition timing adjustment device 195 is disposed on a surface of this functioning portion 211.

Output terminals (not shown) that extend from the pair of electrode plates 203, 205 are connected to this ignition timing adjustment device 195. Further, the ignition timing adjustment device 195 is provided with an input terminal 213 that inputs the ignition signal (the reference ignition signal (A)) from the internal combustion engine control device 37, an output terminal 215 that outputs the corrected ignition signal (the correction ignition signal (B)) to the switching element for use in discharge (e.g. the thyristor) of the capacity discharge section in the internal combustion engine control device 37, and a pair of power terminals 217, 219 that supply power to the ignition timing adjustment device 195, all of which extend from the ignition timing adjustment device 195.

The present embodiment also has the same effects as the embodiment 1. Further, the present embodiment has the advantage of forming the device into a compact shape.

The present invention is not limited to the above embodiments, and variations of the present invention can occur.

(1) For instance, the knocking detection device is not limited to the non-resonant type knocking sensor, and a resonant type knocking sensor can be used. As long as a device can detect the knocking, any device can be used.

(2) In addition, regarding the manner of detecting the knocking, the manner is not limited to the manner of detecting the knocking from the peak of the knocking signal. As long as the knocking can be detected, any manner, e.g. a manner using an integration value, can be used.

(3) Furthermore, the present invention can be applied to a two-cycle engine.

(4) As the external electronic control unit of the present invention, it could be a device that performs each control by the microcomputer. Further, it could be an internal combustion engine control device that is provided as a different device from the ignition timing control device (through a detachable lead line) and controls the operation of the internal combustion.

EXPLANATION OF REFERENCE SIGN

1: internal combustion engine
31, 121, 141, 161, 191: ignition timing control device
37: internal combustion engine control device
38: ignition system
41, 123, 143, 163, 193: knocking detection device
43, 125, 145, 165, 195: ignition timing adjustment device
45, 127, 147, 167: connecting cable
101: reception terminal (first connecting portion)
103: ignition terminal (second connecting portion)
372: CDI-side control section (control circuit section)
373: capacity discharge circuit section
375: capacitor
376: thyristor (switching element for use in discharge)

The invention claimed is:
1. An ignition timing control device comprising:
a knocking detection device that detects knocking of an internal combustion engine; and
an ignition timing adjustment device that adjusts an ignition timing of the internal combustion engine on the basis of a knocking signal indicating a knocking state which is obtained from the knocking detection device and a signal concerning the ignition timing of the internal combustion engine which is externally obtained, and
the knocking detection device and the ignition timing adjustment device being electrically connected and formed integrally with each other, and
the ignition timing adjustment device being provided with
a first connecting portion which inputs the signal concerning the ignition timing; and
a second connecting portion which is connected to a capacity discharge circuit section for igniting the internal combustion engine, the capacity discharge circuit section having a capacitor and a switching element for use in discharging electric charge stored in the capacitor, and which outputs the signal concerning the ignition timing that undergoes adjustment to the switching element, wherein the ignition timing control device comprises the knocking detection device and the ignition timing adjustment device as an integral unit that is configured for attachment and detachment through a lead wire to an engine control unit (ECU) of a vehicle that has no function of ignition timing control for suppressing the occurrence of knocking.

2. The ignition timing control device as claimed in claim 1, wherein:
the knocking detection device and the ignition timing adjustment device are formed integrally with each other in an inseparable manner.

3. The ignition timing control device as claimed in claim 1, wherein:
the knocking detection device and the ignition timing adjustment device are fixedly connected so as to be able to be attached to and detached from each other.

4. The ignition timing control device as claimed in claim 1, wherein:
the knocking detection device and the ignition timing adjustment device are formed integrally with each other through a connecting cable.

5. The ignition timing control device as claimed in claim 1, wherein:
the ignition timing adjustment device is installed in the knocking detection device.

6. The ignition timing control device as claimed in claim 1, wherein:
the signal concerning the ignition timing is a reference ignition signal indicating a timing that is a reference of the ignition timing.

7. An ignition system comprising:
an ignition timing control device comprising a first microcomputer;
a control circuit section comprising a second microcomputer that outputs a signal concerning an ignition timing of an internal combustion engine; and
a capacity discharge circuit section for igniting the internal combustion engine, the capacity discharge circuit section having a capacitor and a switching element for use in discharging electric charge stored in the capacitor, the switching element being driven on the basis of the signal concerning the ignition timing that undergoes adjustment by the ignition timing control device, wherein
a first connecting portion that is provided in the ignition timing control device and the control circuit section are connected, and
a second connecting portion that is provided in the ignition timing control device and the switching element of the capacity discharge circuit section are connected,
wherein the first microcomputer is separate from the second microcomputer, and
the ignition timing control device is configured for attachment and detachment to an engine control unit (ECU) of a vehicle that has no function of ignition timing control for suppressing the occurrence of knocking.

8. The ignition system as claimed in claim 7, wherein:
the ignition timing control device has:
a knocking detection device that detects knocking of the internal combustion engine; and
an ignition timing adjustment device that adjusts an ignition timing of the internal combustion engine on the basis of a knocking signal indicating a knocking state which is obtained from the knocking detection device and a signal concerning the ignition timing of the internal combustion engine which is externally obtained, and
the knocking detection device and the ignition timing adjustment device are electrically connected and formed integrally with each other, and
the ignition timing adjustment device is provided with
the first connecting portion which inputs the signal concerning the ignition timing; and
the second connecting portion which outputs the signal concerning the ignition timing that undergoes adjustment to the switching element.

9. The ignition system as claimed in claim 8, wherein:
the knocking detection device and the ignition timing adjustment device are formed integrally with each other in an inseparable manner.

10. The ignition system as claimed in claim 8, wherein:
the knocking detection device and the ignition timing adjustment device are fixedly connected so as to be able to be attached to and detached from each other.

11. The ignition system as claimed in claim 8, wherein:
the knocking detection device and the ignition timing adjustment device are formed integrally with each other through a connecting cable.

12. The ignition system as claimed in claim 8, wherein:
the ignition timing adjustment device is installed in the knocking detection device.

13. The ignition system as claimed in claim 8, wherein:
the signal concerning the ignition timing is a reference ignition signal indicating a timing that is a reference of the ignition timing.

* * * * *